United States Patent [19]

Arndt et al.

[11] Patent Number: 5,701,495

[45] Date of Patent: Dec. 23, 1997

[54] SCALABLE SYSTEM INTERRUPT STRUCTURE FOR A MULTI-PROCESSING SYSTEM

[75] Inventors: Richard Louis Arndt; James Otto Nicholson; Edward John Silha; Steven Mark Thurber; Amy May Youngs, all of Austin, Tex.

[73] Assignee: International Business Machines Corporation, Armonk, N.Y.

[21] Appl. No.: 573,918

[22] Filed: Dec. 18, 1995

Related U.S. Application Data

[63] Continuation of Ser. No. 124,182, Sep. 20, 1993, abandoned.

[51] Int. Cl.⁶ .................................................. G06F 9/46
[52] U.S. Cl. ................................... 395/736; 395/737
[58] Field of Search ................................ 395/736, 739, 395/741, 733, 734

[56] References Cited

U.S. PATENT DOCUMENTS

| | | | |
|---|---|---|---|
| 4,271,468 | 6/1981 | Christensen et al. | 395/725 |
| 4,349,873 | 9/1982 | Gunter et al. | 395/725 |
| 4,394,727 | 7/1983 | Hoffman et al. | 395/725 |
| 4,413,317 | 11/1983 | Swenson | 395/725 |
| 4,495,569 | 1/1985 | Kagawa | 395/725 |
| 4,530,091 | 7/1985 | Crockett | 370/60 |
| 4,604,500 | 8/1986 | Brown et al. | |
| 4,799,148 | 1/1989 | Nishioka | 395/725 |
| 4,807,111 | 2/1989 | Cohen et al. | 395/725 |
| 4,860,190 | 8/1989 | Kaneda et al. | |
| 4,862,354 | 8/1989 | Fiacconi et al. | 395/725 |
| 4,914,653 | 4/1990 | Bishop et al. | 370/85.6 |
| 4,930,070 | 5/1990 | Yonekura et al. | 395/725 |
| 5,109,490 | 4/1992 | Arimilli et al. | 395/325 |
| 5,125,093 | 6/1992 | McFarland | 395/725 |
| 5,138,709 | 8/1992 | Jones et al. | 395/725 |
| 5,179,707 | 1/1993 | Piepho | |
| 5,193,187 | 3/1993 | Strout, II et al. | 395/650 |
| 5,282,272 | 1/1994 | Guy et al. | 395/275 |
| 5,283,904 | 2/1994 | Carson et al. | 395/725 |
| 5,297,290 | 3/1994 | Masui et al. | 395/725 |
| 5,381,541 | 1/1995 | Begun et al. | 395/325 |
| 5,404,535 | 4/1995 | Barlow et al. | 395/725 |
| 5,410,710 | 4/1995 | Sarangdhar et al. | 395/725 |

FOREIGN PATENT DOCUMENTS

| | | |
|---|---|---|
| 0 602 858 A1 | 12/1993 | European Pat. Off. |
| 57-191758 | 11/1982 | Japan. |
| 2259161 | 3/1993 | United Kingdom. |
| 93/00638 | 1/1993 | WIPO. |
| WO 93/00638 | 1/1993 | WIPO. |

OTHER PUBLICATIONS

"Distributed Control Facility . . . ", IBM Technical Disclosure Bulletin, vol. 33 No. 1A, Jun. 1990, pp. 245–247.

(List continued on next page.)

*Primary Examiner*—Jack B. Harvey
*Assistant Examiner*—David A. Wiley
*Attorney, Agent, or Firm*—Anthony V. S. England; Brian F. Russell; Andrew J. Dillon

[57] ABSTRACT

An interrupt subsystem within a data processing system is scalable from low-end uni-processor systems to high-end multi-processor (MP) systems. This interrupt subsystem provides for queueing of interrupts from many sources, and for queueing of interrupts to the best processor in a multi-processor system. The external interrupt mechanism is separated into two layers, an interrupt routing layer and an interrupt presentation layer. The interrupt routing layer routes the interrupt conditions to the appropriate instance of an interrupt management area within the interrupt presentation layer. The interrupt presentation layer communicates the interrupt source to the system software which is to service/process the interrupt. By providing two layers within the interrupt subsystem, application or system software can be written which is independent from the types or sources of interrupts. The interrupt routing layer hides the details of a particular hardware implementation from the software. The interrupt presentation layer interfaces to the system and/or application software, and provides hardware independent functionality.

25 Claims, 8 Drawing Sheets

OTHER PUBLICATIONS

Muhlemann, K., "Towards Interrupt Assignment . . . ", Microprocessor Systems: Euromicro Symposium 1980, Sep. 1980, London, pp. 157–166.

M. D. Bowers et al, "Diagnostic Software and Hardware for Critical Real–Time Systems", IEEE Trans. on Nuclear Sci., vol. 36, No. 1, Feb. 1989, pp. 1291–1298.

D. W. Pritty et al, "Instanet—A Real Time Lan Architecture", IEEE Comput. Soc. Press, Issue XVI+470, 1987, pp. 60–63.

S. Muchmore, "Multibus II Message Passing", Microprocessors and Microsystems, vol. 10, No. 2, Mar. 1986, pp. 91–93.

J. B. Rasmussen et al, "Real–time Interrupt Handling in Ada", Software—Practice and Experience, vol. 17 (3), Mar. 1987, pp. 197–213.

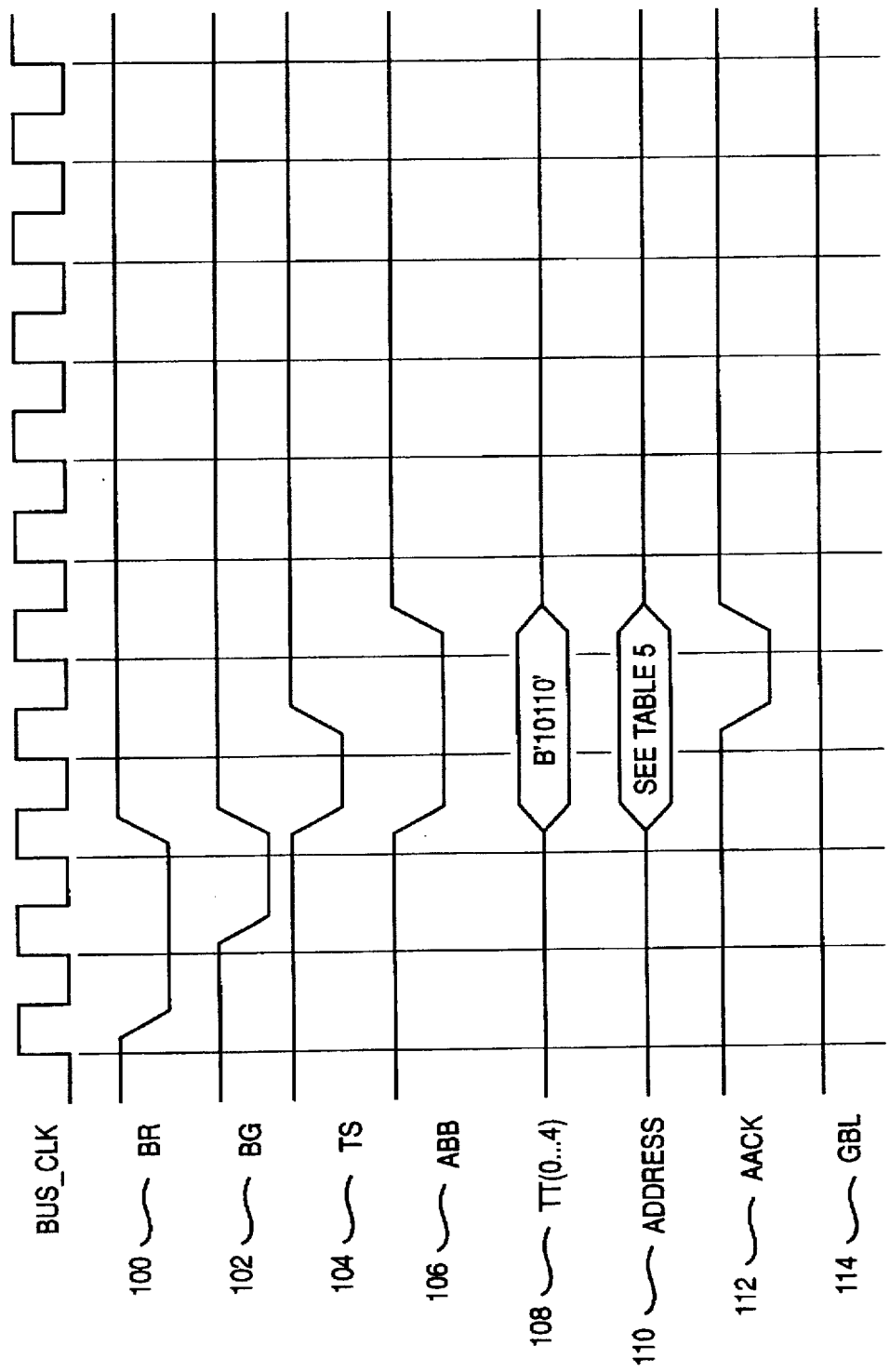

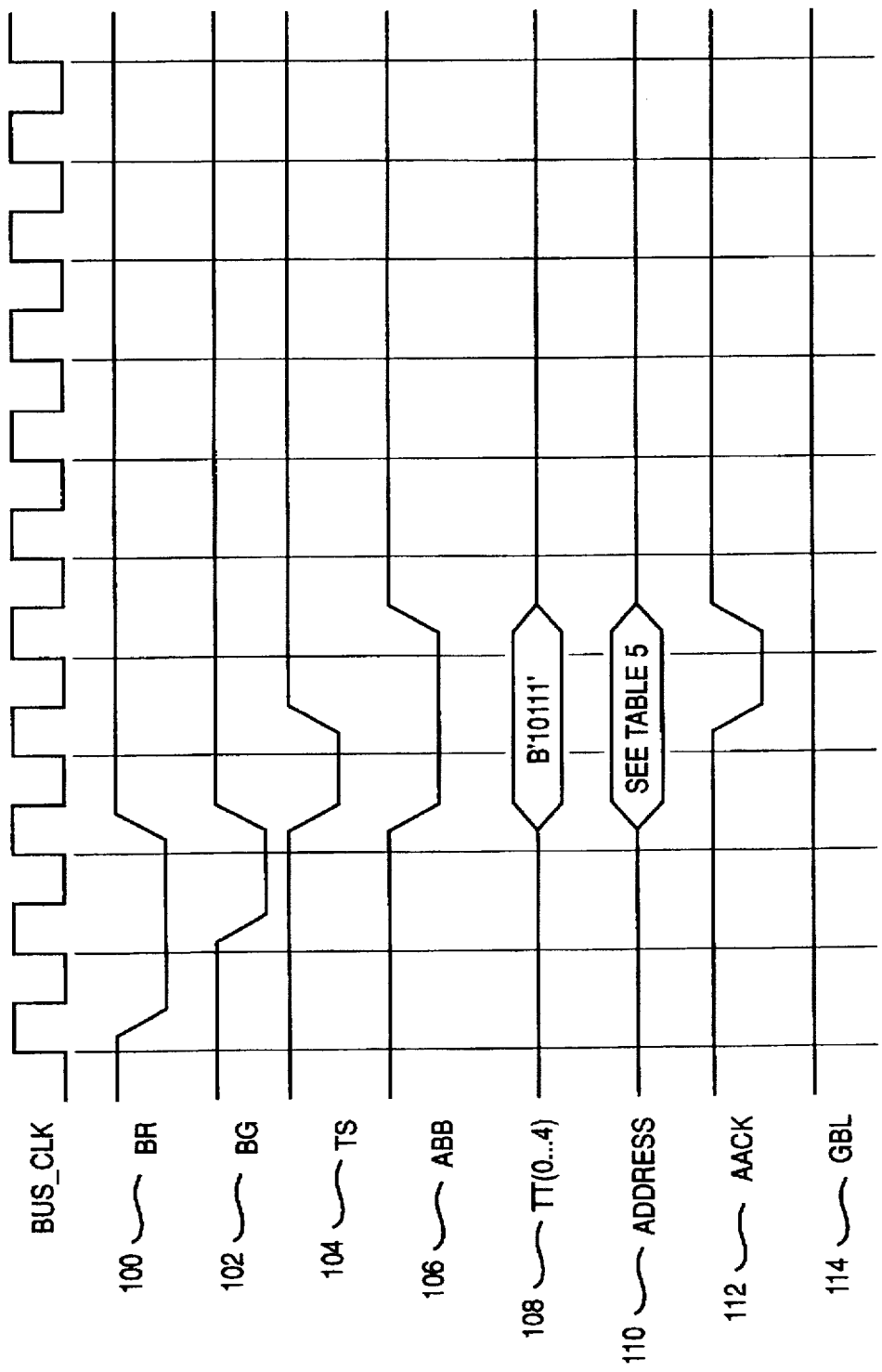

SCALABLE SYSTEM INTERRUPT STRUCTURE FOR A MULTI-PROCESSING SYSTEM

This is a continuation of application Ser. No. 08/124,182 filed Sep. 20, 1993, now abandoned.

TECHNICAL FIELD

This invention relates to data processing systems, and more particularly to a way of signalling interrupt information between an interrupt source and an interrupt processor in a data processing system.

BACKGROUND OF THE INVENTION

In data processing systems, interrupts are used to signal a processor that an interrupt condition exists at a given source. This interrupt source could be, for example, an adapter card on a system bus which requires some type of service. The required service may be to initiate a transfer of data, or to read a status register that has recently changed.

When the processor has been conditioned to accept an interrupt, otherwise known as having the interrupts enabled, the processor will initiate interrupt processing upon the receipt of an interrupt. This interrupt processing typically involves the processor interrogating the source of the interrupt, performing functions based upon the type of interrupt, and resetting/turning off the interrupt.

Interrupt priorities have also been accommodated in traditional systems. If more than one interrupt signal is active at a given time, the use of interrupt priorities tells the processor which interrupt to service first.

Interrupt controllers have been designed to offload certain interrupt handshake functions that are required, such as resetting an interrupt signal. Typical of such interrupt controllers is an Intel 8259 controller, which is described in the Intel Component Data Catalog, 1981 (available from Intel Corp. Literature Department, 3065 Bowers Avenue, Santa Clara, Calif.), and hereby incorporated by reference as background material. These interrupt controllers can monitor multiple interrupt sources, and only interrupt the processor using a single interrupt line.

Current interrupt signalling methods were primarily designed for uniprocessor systems with few interrupt sources or priority levels. Most systems send interrupts over one or more interrupt lines hardwired on the planar. In a multiprocessor environment, where there is more than one processor capable of servicing an interrupt, these types of interrupt signalling techniques cause increases in bus complexity. An interrupt signal from each interrupt source would have to be wired to each processor or interrupt controller capable of servicing such interrupt.

Attempts to satisfy needs of a multiprocessing data processing system have required dedicated interrupt controllers for each processor in the system. This approach is not only costly, but also does not allow for cohesive management of interrupts which are generated from a plurality of sources that must be routed to a plurality of processors for servicing.

A method is needed that is expandable, allowing many interrupt sources and priority levels. In addition, a method of signalling interrupt information is needed for use with multiprocessing systems that handle multiple processors and multiple interrupt controllers.

Current interrupt systems are hardware specific, with varying amounts of software dependencies. A change in the number or types of interrupts requires changes be made to the particular operating system software. An interrupt subsystem is needed that provides software independence from the underlying hardware interrupt structure.

SUMMARY OF THE INVENTION

The present invention is an interrupt subsystem within a data processing system. The interrupt subsystem is scalable from low-end uni-processor systems to high-end multi-processor (MP) systems. This interrupt subsystem provides for queueing of interrupts from many sources, and for queueing of interrupts to the best processor in an MP system. This is achieved by separating the external interrupt mechanism into two layers, an interrupt routing layer and an interrupt presentation layer. The interrupt routing layer routes the interrupt conditions to the appropriate instance of an interrupt management area within the interrupt presentation layer. The interrupt routing layer is scalable to support both low-end/low-cost and high-end/high-performance systems. The interrupt presentation layer communicates the interrupt source to the system software which is to service/process the interrupt. This software accepts the interrupt condition and is responsible for resetting the interrupt condition. This software also indicates the acceptance of the interrupt and notifies the interrupt presentation layer that it has processed the interrupt.

By providing two layers within the interrupt subsystem, application or system software can be written which is independent from the types or sources of interrupts and from the underlying system hardware structure. The interrupt routing layer hides the details of a particular hardware implementation from the software. The interrupt presentation layer interfaces to the system and/or application software, and provides hardware independent functionality.

The present invention further defines an interrupt packet protocol for both interrupt requests and interrupt resets. Address bus packets are used, and have many advantages over the hardwired method. When an interrupt source (hereinafter called an I/O controller, or IOC) has an interrupt request, the IOC requests the address bus. When granted the bus, the IOC sends an interrupt request packet across the address bus. The interrupt controller processes the information and signals an interrupt to the processor. In a multiprocessing system, the interrupt controller may route the interrupt information to an appropriate processor. When the processor is done processing the interrupt, it will alert the interrupt controller to send a reset packet to the IOC. The interrupt controller then requests the address bus. When granted the address bus, the interrupt controller sends an interrupt reset packet across the address bus.

Since there are usually multiple cycles of data transfer for each address, the data bus is more heavily used than address bus. By sending interrupt information over the address bus, it is possible to use an underutilized resource, the address bus, and not use the busier data bus. Another advantage of using the address bus is that, in the preferred embodiment, all the IC chips on the system bus use the entire address bus. However, these IC chips do not all use the entire data bus. Thus, the interrupt packets going over the address bus use the address lines already in the system at a cost of zero pins and zero wires. This is in contrast to prior methods, which use several distinct interrupt lines.

Since memory mapped I/O is the most widely used method of performing input and output operations, it is used as the method for sending interrupt packets. Being the most common method of performing I/O, all the chips on the system bus already have logic to do memory-mapped I/O.

In the preferred embodiment, the interrupt packet definition allows for 16 interrupt sources from each of 512 IOCs. There are 256 interrupt priority levels. Each system may have 256 interrupt servers. This allows the packet definition to be used in a wide range of machines. There are reserved bits in both the Interrupt Request Packet and Interrupt Reset Packet that may be used by systems that need to transmit more information in the interrupt packets. This packet definition thus allows for providing extendibility for future systems.

Older hard-wired interrupt systems provided little immediate information about an interrupt. The bus packet method provides interrupt source, IOID, priority, and server information all at the same time and in the same place. In addition to system flexibility, this makes system interrupt debug much easier. Information can be put into the reserved address bits 0-2 of the Interrupt Reset Packet to tell the IOC which kind of Interrupt Reset is being sent.

Since interrupts are transferred over the address bus, they are sequenced with other interrupts and with other system operations. This is helpful during debug because it makes interrupts more observable at a system level and less asynchronous to the system.

Since interrupt information is defined in various fields in the interrupt packet instead of being hardwired on the planar, this interrupt system is very programmable. Interrupt priority, server number, interrupt source and I/O controller ID are all programmable by using this packet structure. Thus, the interrupt structure is more flexible than those of hardwired systems.

It is therefore an object of the present invention to provide an improved data processing system.

It is a further object of the present invention to provide an improved interrupt subsystem within a data processing system.

It is yet a further object of the present invention to provide an improved interrupt system within a multi-processor data processing system.

It is still a further object of the present invention to provide an improved interrupt signalling method.

These, and other, objects of the present invention will now be further described with reference to the following drawing, in which:

BRIEF DESCRIPTION OF THE DRAWINGS

FIG. 7 shows a bus timing diagram for an interrupt request.

FIG. 8 shows a bus timing diagram for an interrupt reset.

DETAILED DESCRIPTION OF THE PREFERRED EMBODIMENT

Figure 1:
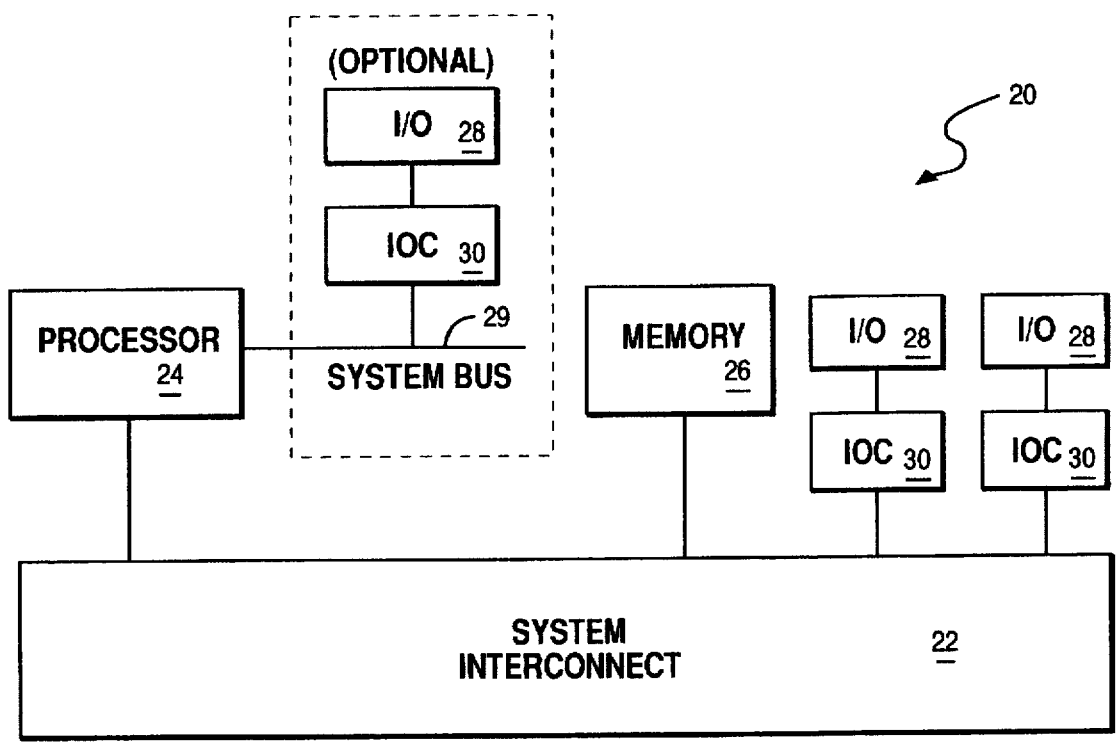
FIG. 1 shows a block diagram of a data processing system.

FIG. 1 illustrates the logical view of a data processing system 20. The system interconnect 22 allows for the transfer of data among the various components of the system: the processor 24, memory 26, and I/O 28 attached via an Input/Output Controller (IOC) 30 which is directly attached to the system interconnect 22. There may also be optional system bus(es) 29 from the processor to which additional I/O and IOCs are attached. The system interconnect 22 may be one of several different constructs (for example, a system bus, a switch, etc.) and is system dependent. In the preferred embodiment, the system interconnect is a system bus.

Figure 2:
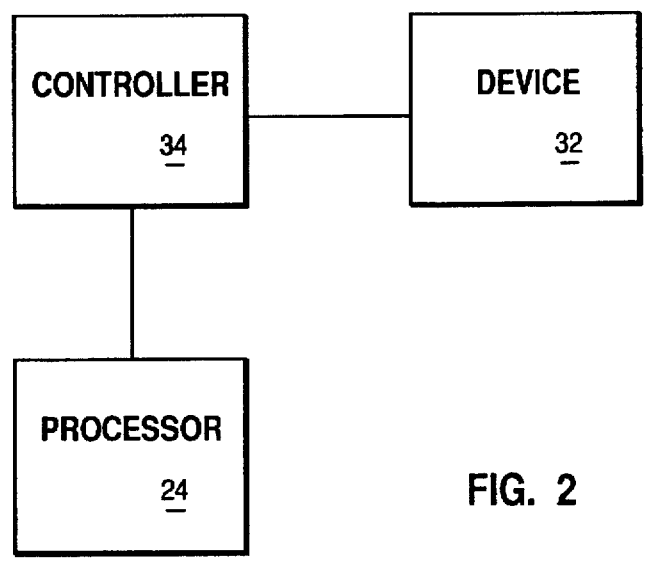
FIG. 2 shows a block diagram of a device interface to a data processor through an interrupt controller.

The external interrupt structure for today's systems is required to span a wide range of system requirements from the simple single user personal computer to multi-user systems consisting of a hierarchy of multiple processors. Previous techniques can not effectively address such a range. The programming interface to, and the logical view of, the interrupt system needs to be consistent. A typical interrupt structure is shown in FIG. 2, wherein a device 32 (comprising I/O 28 and IOC 30 of FIG. 1) capable of generating an interrupt is interfaced to a servicing processor 24 through an interrupt controller 34. This invention identifies an improved interrupt control structure which is scalable across a wide range of systems yet keeps a consistent programming model.

Figure 3:
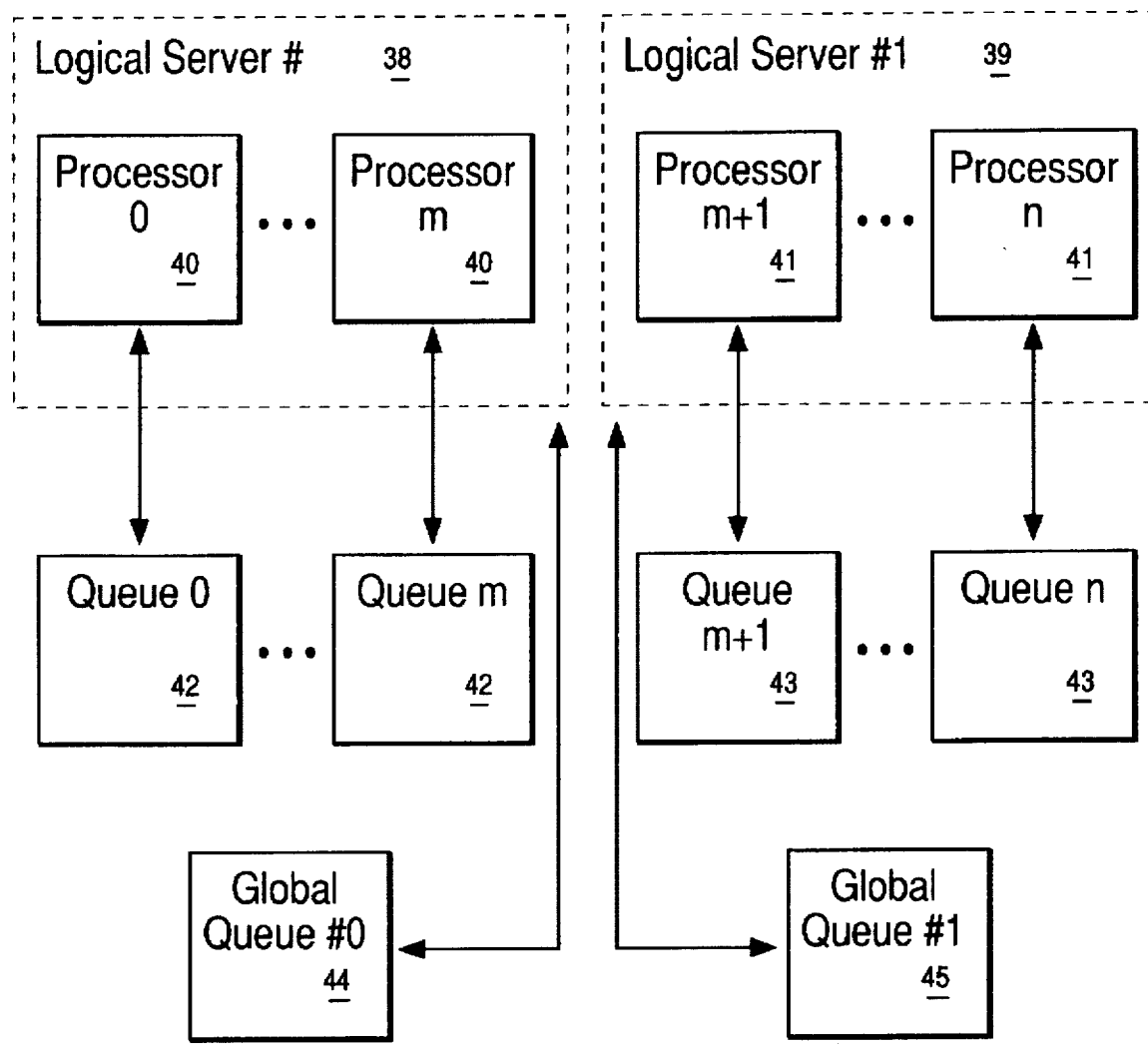
FIG. 3 shows the components of a logical server interfacing to software queues.

Referring now to FIG. 3, the logical view of the system as seen from the system software is that of n (up to 256) queues of events. Within each software queue 42 and 43 there exists a prioritized list of events. These events comprise hardware generated interrupts (e.g. external interrupts from the IOCs) and software generated interrupts (e.g. inter-processor interrupts). Each queue 42, 43 is associated with a logical server. Queues 0 through m are associated with logical server #0, and queues m+1 through n are associated with logical server #1. Additional logical servers having additional processors could similarly be configured. In a single processor system, there is one server and, therefore, one queue. In a multi-processor system, there would be one queue associated with each processor and at least one global queue associated with the collection of processors viewed as one logical server. For example, FIG. 3 shows each queue 42 associated with a processor 40, and a global queue 44 associated with the collection of processors 0 through m. The collection of processors 40 is viewed as logical server #0 at 38. Similarly, each queue 43 is associated with a processor 41, and a global queue 45 is associated with the collection of processors m+1 through n. The collection of processors 41 is viewed as logical server #1 at 39. For multi-processor systems, there must be a mechanism for determining which processors are available for use by each global queue. This mechanism is provided by the Available Processor Register (APR) (to be further described with reference to FIG. 4).

Continuing with FIG. 3, associated with each queue 42, 43 is a server number in the range of 0×00 through 0×ff. The individual processors 40, 41 within the complex are assigned server numbers ascending from 0×00, and queues which serve multiple processors (i.e. the global queues) are assigned server numbers descending from 0×ff. Queue lengths (i.e. the length of the prioritized list within the queue) are implementation dependent, but have a minimum depth of one.

External interrupts are sourced from IOC(s), other processors in the complex, and from other sources in the system (for example, an emergency power off warning interrupt). While the different sources require different physical signalling mechanisms, the logical appearance to the server (either the logical server for the global queues or the processor for other queues) is as one queue headed by the most favored event, as will be further described below. The highest priority (i.e. most favored) interrupt is defined to be 0x00 and the lowest priority interrupt (i.e. least favored) is defined to be 0xff. Hence, interrupt level 0x5500 is more favored than interrupt level 0xff and less favored than interrupt level 0x00.

Figure 4:
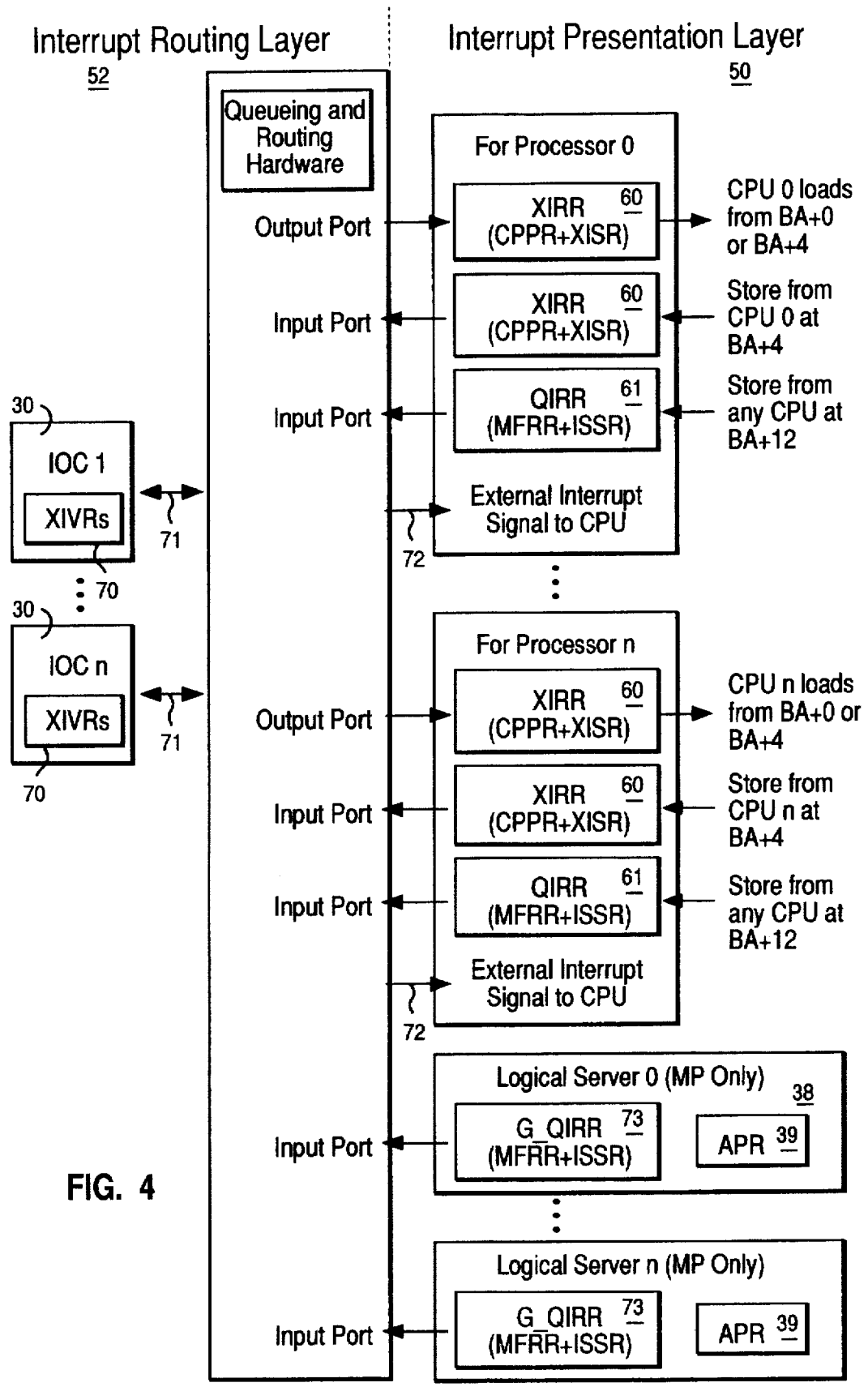
FIG. 4 shows the internal structure of an interrupt controller.
Figure 6A:
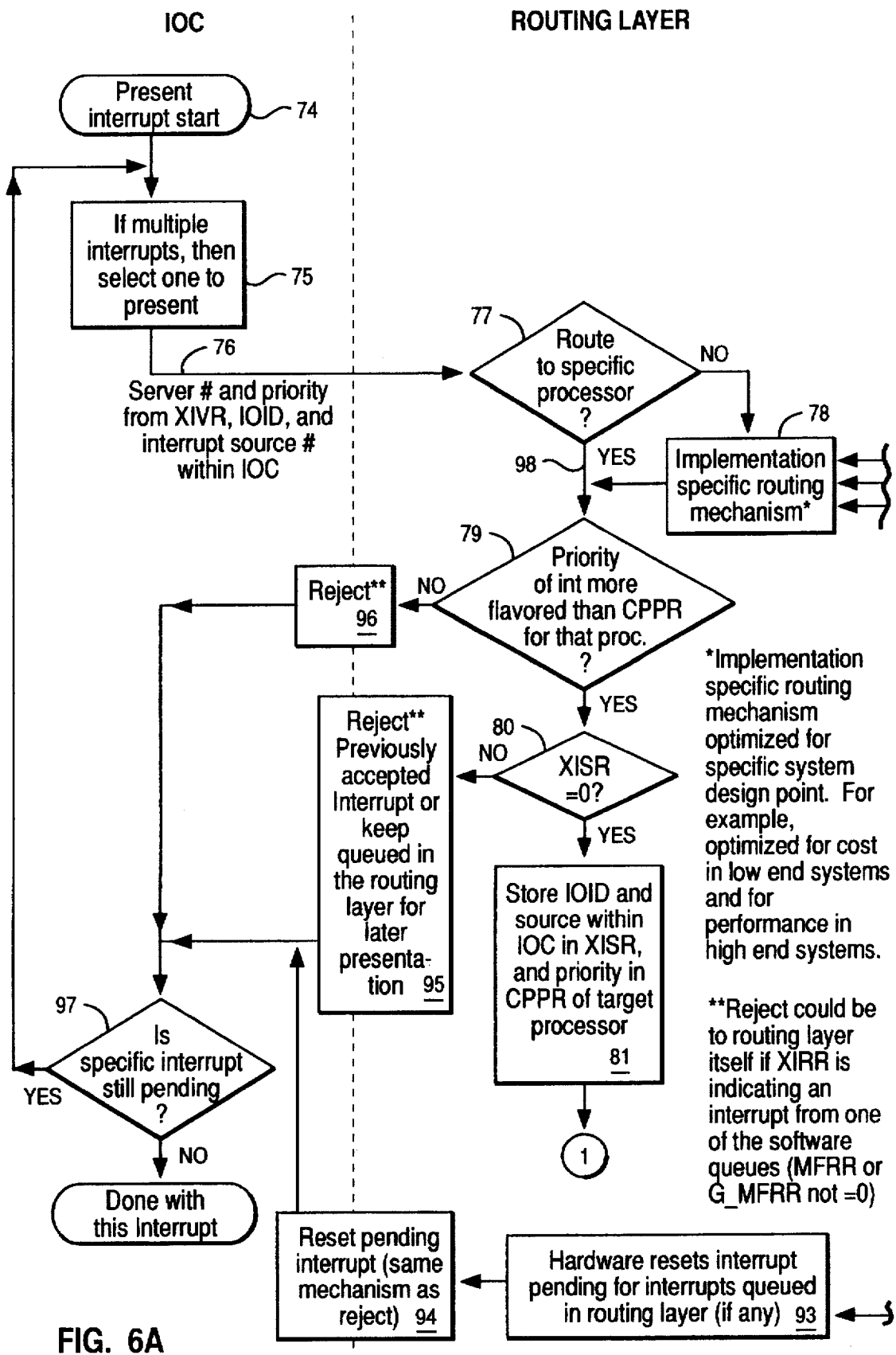
FIGS. 6A and 6B together depict shows a flowchart of the overall interrupt subsystem, including the I/O controller, the interrupt routing layer, and the interrupt presentation layer.
Figure 6B:
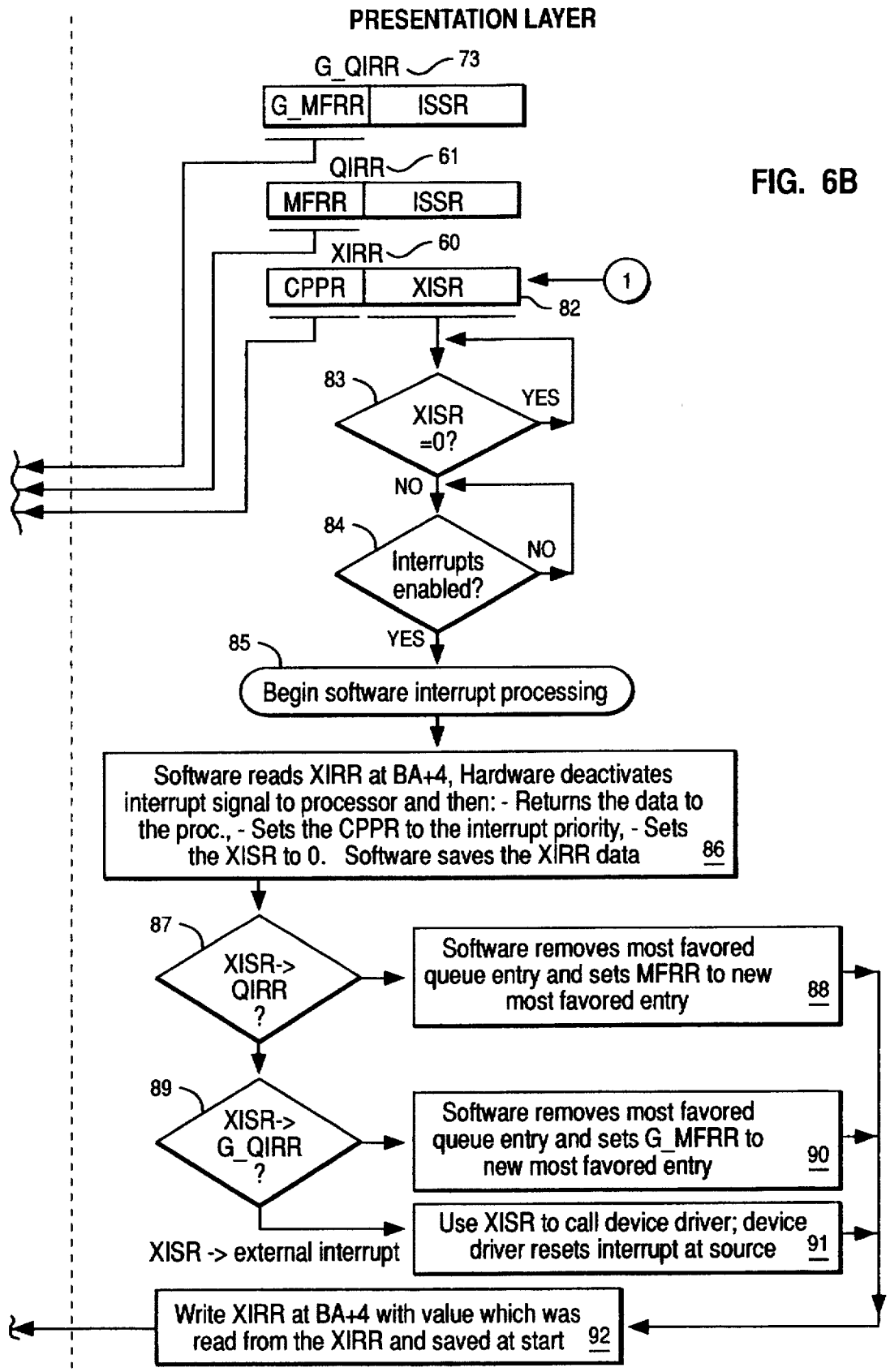

This invention separates the external interrupt mechanism (i.e. the interrupt controller) into two layers: (i) the interrupt presentation layer and (ii) the interrupt routing layer. These layers are shown in FIGS. 4 6A and 6B. Referring to FIG. 4, the interrupt presentation layer 50 comprises registers associated with processors or servers. The operating system software interfaces to these processors or servers to create and handle individual interrupts. The interrupt presentation layer 50 has a defination which only varies by the number of processors or servers within a system. The interrupt routing layer 52 routes the interrupts from the sources to the destinations and is by its nature far more implementation specific. System software may have to set up the configuration of the interrupt routing layer 52 at power-on time, but does not have to interface to this interrupt routing layer on a per interrupt basis.

The registers used to manage interrupts are now briefly described, and will be later described in more detail.

Available Processor Register (APR)

Optional register to be used by the interrupt routing layer hardware to know which processors are available for a particular server for which to route interrupts. The APR(s) are intended to be used with global queues, and are shown at 39 of FIG. 4.

Global Queued Interrupt Request Register (G_QIRR)

This register may be written as a single byte or as four bytes (a 32 bit word), and is shown at 73 of FIG. 4.

Used in Symmetric MP (SMP) systems as a non-processor specific server queue.

Consists of two registers:

Global Most Favored Request Register (G_MFRR), which is an MFRR.

Interrupt Source Specification Register (ISSR)

Used in SMP systems to configure the source specification of a G_MFRR interrupt (see XISR).

Queued Interrupt Request Register (QIRR)

This register may be written as a single byte or as four bytes (a 32 bit word), and is shown at 61 of FIG. 4.

At least one per processor plus one per non-processor specific server queue

Consists of two registers:

Most Favored Request Register (MFRR)

Holds the priority of the most favored request on the queue

This register can be read back by the software to verify that the write has taken place.

Interrupt Source Specification Register (ISSR)

External Interrupt Request Register (XIRR)

One per processor, shown at 60 of FIG. 4, and provides a single source identifier to the system software for interrupts.

Consists of two registers:

Current Processor Priority Register (CPPR)

This register is updated by the software to contain the current processor priority This register is updated, when the software issues a Load instruction to the XIRR at a certain address, to the priority of the interrupt represented by the XISR data which is delivered by the executed Load instruction.

External Interrupt Source Register (XISR)

Indicates the source of a pending interrupt (or a value of 0, if no pending interrupt)

External Interrupt Vector Register (XIVR)

One per interrupt level in each IOC, shown at 70 of FIG. 4.

Used to prioritize each interrupt level

Can be used to vector particular interrupts to particular servers

Interrupt Routing Layer

The goal of the interrupt routing layer is to direct the most favored interrupt request to the processor operating at the least favored priority, i.e. the best processor. To the best of its ability, the interrupt routing layer avoids sending an interrupt to a processor which is running at a more favored level than the incoming request. This invention allows the interrupt routing layer to be implemented differently depending on the system requirements. Therefore, different implementations may approximate the above goal to different levels of accuracy and this will appear as a variable delay in the routing of interrupt requests. The greater the expected system load due to interrupts, the closer the interrupt routing hardware should approach the goal in order to achieve proper system performance. To fully achieve this goal, the interrupt routing hardware would have to be fully aware of the state of the system (that is, the exact per cycle processor priority, and the contents of all logical interrupt request queues). In practice this may not be possible because: (i) there may be more potential interrupt requests than the hardware queues within the interrupt routing layer; or (ii) the processor priority may take several cycles to propagate from the processor to the interrupt routing hardware, causing a certain level of uncertainty in the interrupt routing layer as to the exact per-cycle processor priority. The depth of queue problem is handled by requiring the IOCs to resubmit interrupt request messages that are rejected by the interrupt routing hardware. This allows the interrupt routing hardware to implement a queue depth (minimum of one) to satisfy some percentage of the expected cases, with the interrupt rejection mechanism used to handle any overflow cases. The system software is unaware of the rejection mechanism which only exhibits a variable latency to affected interrupt requests. Since the interrupt routing hardware may be unaware of the true processor priority when it first routes a request toward a processor, the routing hardware must be prepared for the software to change its operating priority after the interrupt routing hardware has initially assigned a request to a specific processor. Failure to take changing processor priority into account can result in priority inversions and severe system performance degradation (priority inversion can occur if an interrupt is queued which has a less favored priority than the current processor-priority, and if that queued interrupt prevents an interrupt with a more favored priority than the processor from getting in and interrupting the processor); the queued interrupt will not get serviced until the processor drops down in priority below the queued interrupt priority. Again, the interrupt rejection mechanism may be used to recover from queue resource problems. By rejecting the interrupt back to the IOC, the IOC acts as an extension to the interrupt routing layer queuing mechanism.

An interrupt source will typically send a particular interrupt to the interrupt routing layer via interface 71 (FIG. 4) only once, unless one of the following occurs: (i) the interrupt is rejected by the interrupt routing layer; or (ii) the interrupt is reset by the software writing to the XIRR with an XISR value equal to the interrupt source and the interrupt for the interrupting source is still pending (i.e. has not yet been serviced). This will be further described below with reference to FIG. 6.

Various implementations of the interrupt routing layer 52 are possible, including (i) a single element queue per processor consisting of an external interrupt priority and source for low-end machines, or (ii) multiple external interrupt source queue registers for high-end machines. The hardware assures that the exact hardware queueing implementation within the interrupt routing layer is transparent to the system software which interfaces to the interrupt presentation layer. There are numerous types of queueing techniques known in the art that may be used, such as a hardware register file whose entities are kept in priority order, described in U.S. Pat. No. 4,807,111 are hereby incorporated by reference. A key feature of the present invention is the use of such queues by an interrupt presentation layer. This interrupt presentation layer provides software transparency from the underlying queue implementation within the interrupt routing layer.

At system setup time, the setup software must determine the Interrupt Routing Layer configuration, including how many logical servers are supported, which processors support which logical server, and which interrupts are to be directed to which server. This is done by reading some implementation specific registers, or by having the configuration information stored in ROM. APR's are used to specify which processors work against which logical server queue. The specific setup determination is hardware dependant, and will vary between differing hardware implementations. The only requirement is that the above listed setup information, however determined, is placed in the APRs for subsequent access by the interrupt routing layer.

Interrupt Presentation Layer

The inter-processor interrupt mechanism has a physical queue of request blocks (57 of FIG. 5) in system memory that are associated with each queue 42, 43 of FIG. 3. Each of these software-managed queues are maintained in priority order by the software. The implementation of the queue is not defined in the interrupt mechanism, but rather is left up to the operating system software. The implementation of the various queues may be different depending upon the expected frequency of use. Associated with each queue is a Most Favored Request Register (MFRR) (in system memory space). When a program needs a Service performed by a particular processor, it enqueues a request block to that processor's queue, it determines if the new request is at a more favored priority, and if it is, the value of the new request's priority is written into the MFRR. When a program dequeues a request for service, the priority value of the next request on the queue is loaded into the MFRR. If the queue is empty after dequeue, the least favored value (0xff) is loaded into the MFRR. A value other than 0xff in the MFRR indicates to the interrupt hardware in the interrupt routing layer that an interrupt of that priority should be signalled at 72 to a (the) processor which services that queue.

Each processor has associated with it a memory mapped Interrupt Management Area which contains the external Interrupt Request Register (XIRR) 60. The XIRR is a 4-byte facility and is composed of two fields: the Current Processor Priority Register (CPPR) and the External Interrupt Source Register (XISR).

The CPPR contains the processor's operating priority. The CPPR may be written by the system software to prevent interruptions from less favored priority requests. The interrupt routing layer will only direct an interrupt request to a processor if its CPPR field is less favored than the priority of the interrupt request. The system software stores to the CPPR as a 1-byte register to inform the interrupt hardware in the interrupt routing layer of the current operating priority of the processor.

To determine the source of the interrupt, the system software reads the XISR by issuing a Load instruction to the XIRR. The value in the XISR specifies the source of the interrupt (if an IOC, which IOID and level; if a processor, which server queue). Based upon this information, the software can determine the proper program or process to invoke to service the interrupt. The XISR presents the appearance of a read only register from the interrupt routing layer for Load operations, and a write only register to the interrupt routing layer for Store operations. That is, what is written is not automatically what is read, since the hardware interprets a write to the XISR to be a signal to send an interrupt reset to the interrupting source (and not a signal to directly write to the XISR bits themselves, as will be later described). The XISR must be accessed atomically along with the CPPR when a 4-byte accesses is directed to the XIRR. For interrupts from IOCs, the upper bits of the XISR indicate the IOC IOID, and the low order 4 bits of the XISR field define up to 16 sources (or levels) within an IOC. Several values of this register have defined meanings. The XISR will be further described below.

The interrupt presentation layer of the interrupt mechanism is embodied through an Interrupt Management Area for each processor in the system, as shown below in Table 1. The Interrupt Management Area is within the data processing system's memory space. The starting address of the processor's interrupt management area is referred to as its Base Address (BA) for the rest of this document. The BA is different for each processor (that is, there is a separate Interrupt Management Area for each processor), and these areas can be accessed by any processor (there is no protection against it). The BA for a processor is setup at configuration time. The layout of the Interrupt Management Area is as follows:

TABLE 1

Interrupt Management Area: Interrupt Presentation Layer Registers

| Address | Byte 0 | Byte 1 | Byte 2 | Byte 3 | Comments |
|---|---|---|---|---|---|
| BA+0 | CPPR | | XISR | | XIRR without side effects |
| BA+4 | CPPR | | XISR | | XIRR with Load/Store side effects |
| BA+8 | DSIER | | DSIER | | Data Storage Interrupt Error Register |
| BA+12 | MFRR | | ISSR | | Required QIRR |
| BA+16 | MFRR | | ISSR | | Optional 2nd QIRR |
| BA+20 | MFRR | | ISSR | | Optional 3rd QIRR |
| ••• | MFRR | | ISSR | | Optional nth QIRR |

Queuing

Figure 5:
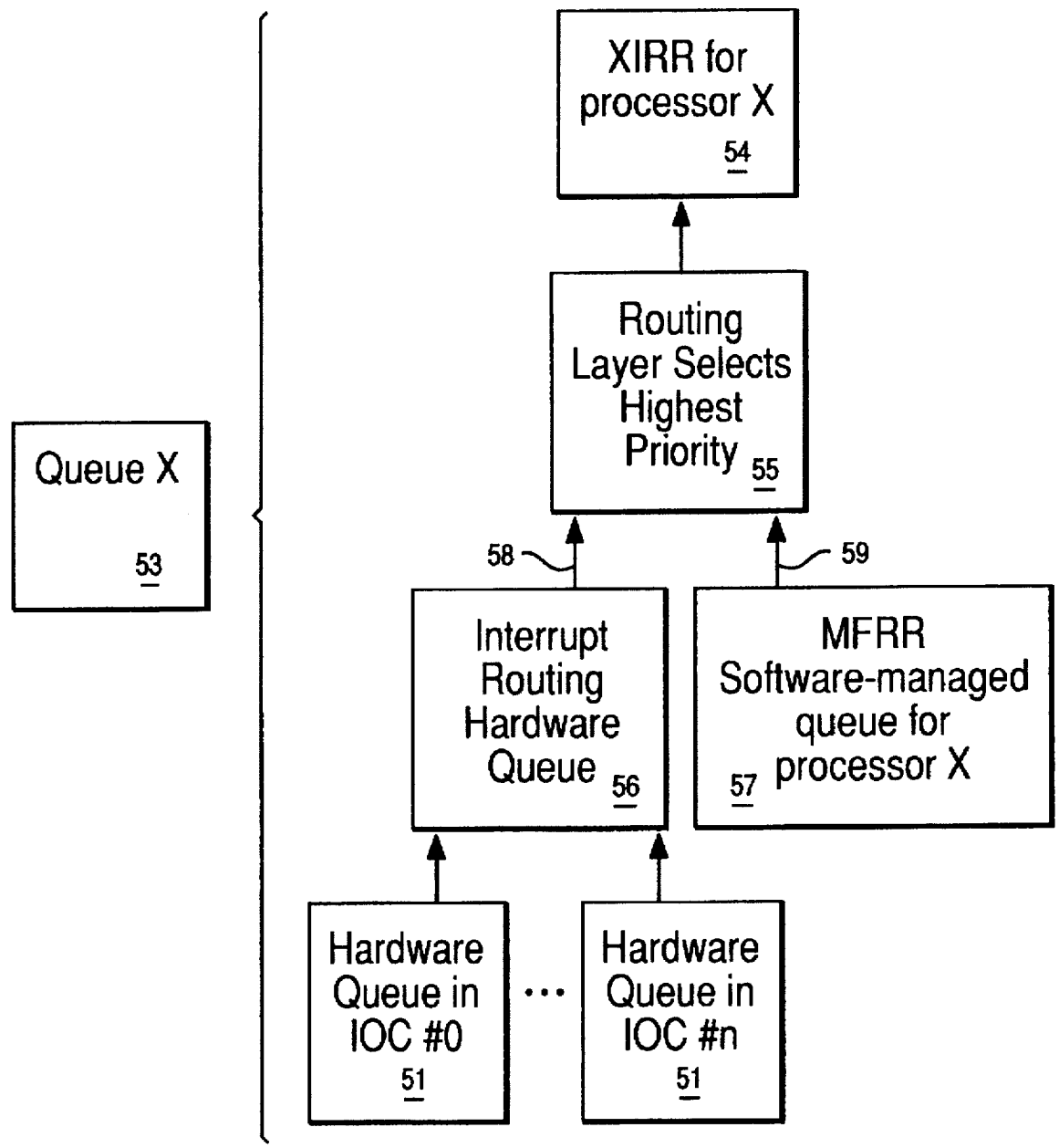
FIG. 5 shows the hardware and software queue structure.

FIG. 5 shows the interrelationship between the various queues previously described. The software queue 42, 43 that provides the consistent, hardware independent interface to the system software is shown for a particular processor X at 53. Queue X interfaces to processor X through the XIRR register shown at 54. This XIRR register can be modified by the interrupt routing layer 52 at 55. The step of selecting the highest priority by the routing layer at 55 must account for a plurality of interrupt types. Hardware interrupts which are maintained in a hardware queue at 56 are presented to the interrupt routing layer 52 at 58. These hardware interrupts are sourced from individual IOC hardware queues at 51. In addition, software generated interrupts may be presented to the interrupt routing layer 52. These software interrupts (e.g. inter-processor interrupts) are maintained in a software managed queue at 57, and presented to the interrupt routing layer at 59 through the MFRR register.

In summary, the software queues 42 and 43 of FIG. 4 which are presented to the system software are a combination of software-managed queues and hardware interrupt queues. Thus, the hardware queues can be distributed between the routing layer and the IOCs. Further, the hardware-generated and software-managed queues are presented to the system software using a uniform interface, the XIRR register.

Interrupt Handling

The overall flow of the interrupt handling is shown in FIG. 6A and 6B. When an IOC has an interrupt which needs servicing at 74, it first determines if this is the highest priority which needs to be presented. If there is a higher priority interrupt that has not been serviced yet, it will present that interrupt first at 75. The IOC will select the XIVR associated with the particular interrupt to be presented and will send the Server number and priority from the XIVR, along with the IOC IOID and a number indicating the source within the IOC which is requesting service to the interrupt routing layer at 76. The interrupt routing layer can use the server number from the interrupt information to direct at 77 the interrupt to a specific processor (server) 98 or if the server number does not correspond to a particular processor in the system, to choose which processor to which to route the interrupt at 78. How the hardware chooses to which processor to route the interrupt in this latter case is implementation dependent, and can be optimized based on the system design point (.for example cost on the low end or performance on the high end). Information which comes into this routing decision block 78 is what priority the various processors are operating (the CPPR value) and what other priorities are queued up waiting for that processor (for example, the MFRR or G_MFRR for that processor). If the priority of the interrupt received from the IOC is less favored or equal priority to existing interrupts queued at 79, then the interrupt is rejected at 96 back to the IOC, and the IOC must represent the interrupt at a later time (for example, after some fixed amount of time has elapsed). If the interrupt from the IOC is more favored than an existing queued interrupt which has already been placed into the XIRR of the target processor 80, then the interrupt placed into the XIRR previously is rejected back to the IOC from which it came at 95, and the new interrupt takes its place at 81. Although a particular implementation of an interrupt routing layer mechanism may chose to queue the interrupt in the routing layer for presentation at a later time, in the preferred embodiment the routing layer rejects the interrupt back to the source, and the source represents the interrupt at a later time. The loading of the XISR must be atomic; that is, the hardware must guarantee that the system software and interrupt routing layer are not trying to access the XISR simultaneously (for example, if the hardware is trying to update the XIRR with a higher priority request at the same time the processor was trying to read the XIRR).

When the XISR contains a non-zero value at 83, an interrupt is signaled to the processor by the hardware via the interrupt signal into the processor hardware. When the interrupt is signaled and when the interrupts are enabled at 84, the software receives the interrupt signal and the interrupt processing begins at 85. The software, at the beginning of the interrupt processing, reads the XIRR at 86 and saves that value away until the end of the interrupt processing.

When the software reads the XIRR, the hardware will place the priority of the interrupt represented by the XISR value into the CPPR and set the XISR to 0 at 86. Setting of the CPPR to the value of the priority of the interrupt prevents the software from having to do that; the processor priority at the start of service of that interrupt will be equal to the priority of the interrupt, so that the interrupt routing layer will not interrupt that servicing with a less favored interrupt. By setting the XISR to 0, the interrupt signal to the processor is deactivated, and, if the processor would read the XIRR later, a value of 0 in the XISR would signal that no interrupts are pending. Once an interrupt has been presented to a processor by the processor reading the XIRR at BA+4, this signals the hardware that the software will start processing the interrupt, and therefore, the interrupt routing layer may neither preempt nor cancel the request. After reading the XIRR, the software uses the value in the XISR field of the XIRR to determine what interrupt servicing routine to invoke. If the XISR points to the QIRR at 87, the software removes the most favored queue entry from that queue and sets the MFRR in the QIRR to the value of the priority of the new most favored entry on that queue 88 or to the value of 0xff, if the queue is then empty. If the XISR points to the G_QIRR at 89, the software removes the most favored queue entry from the global queue and sets the G_MFRR in the G_QIRR to the value of the priority of the new most favored entry on that queue at 90, or to the value of 0xff if the queue is then empty. If the XISR doesn't point to one of the software queues, then it points to an external interrupt service routine, and the software invokes the appropriate device driver to service the interrupt at 91. In the case of an external interrupt, after the device driver has serviced the interrupt, it will reset the interrupt in the IOC during the course of the service routine (for example, most hardware would reset the interrupt in the IOC by issuing a store instruction to a certain address in the IOC's address space). No matter what the source of the interrupt, at the end of the servicing, the software will write the XIRR at BA+4 with the value which was read from the XISR and saved at the start of the interrupt servicing 92. When the XIRR is written at BA+4, the CPPR will be set to the value in the store data (which, in this case, will be the value of the CPPR at the beginning of the interrupt servicing) and will issue an interrupt reset to the interrupt routing layer at 93 and IOC at 94 with the IOID and source within the IOC as specified in the XISR data that is written (which, in this case, will be the value of the XISR at the start of the interrupt, so this will reset the interrupt which has just been serviced). When the IOC receives the reset, if the hardware still thinks that an interrupt is pending at 97 (for example, if the interrupt has occurred again since the software servicing and the write to the XIRR), then the interrupt presentation process starts over again at 74.

The XIRR facility appears twice in the external interrupt management area. Address BA+0 is designed to be used with interrupt polling. Address BA+4 has side effects when read or written, and is designed to allow efficient interrupt handler software by having the hardware assist the software in the interrupt queueing process. The registers and their use are further described below.

Processor to Processor Interrupts

The Most Favored Request Register (MFRR) holds the priority of the most favored request queued on a software managed queue for this processor. When written to a value other than 0xff, the MFRR competes with other external interrupts for the right to interrupt the processor. When the MFRR's priority is the most favored of all interrupt requests directed to the processor, an appropriate value is loaded into the XISR (see XISR register description), and an interrupt is signaled to the processor. When the processor reads the XIRR at BA+4, the value in the MFRR will be loaded by the hardware into the CPPR. The MFRR may be read back by the software to ensure that the MFRR write has been performed.

During the processing of an inter-processor interrupt, the highest priority request is dequeued by the software from the software queue associated with the MFRR and the priority of the next favored request is loaded into the MFRR by the software, using traditional queue management techniques known in the art.

Global Queues

In MP systems, the system memory space contains one or more Global Queue MFRR's which are used by software to send inter-processor interrupts to any processor within some server group. The Global Queue MFRR's work just like the per processor MFRR described above except that the interrupt routing layer determines the processor to receive the request based upon its own algorithm, and the value loaded into the XISR is an IOID which indicates the Global Queue. This routing algorithm can similarly be optimized based upon the system design point. For example, a system optimized based on cost might route to a random processor to prevent from having to implement priority comparison logic, whereas a system which is implemented for high performance would attempt to always route to the processor which is running at the least favored priority.

External Interrupt Vector Register (XIVR)

Each IOC 30 contains one External Interrupt Vector register 70 for each external interrupt that it will support. The bits in each of these registers are defined as follows:

TABLE 2

XIVR REGISTER DESCRIPTION

| BITS | DESCRIPTION |
| --- | --- |
| 0–15 | Reserved: These bits are reserved and should be set to a value of 0 by the software on a Store instruction. These bits will be returned by the hardware as a value of a 0 on a Load instruction (software note: these bits are only guaranteed to be 0 as long as this field remains "reserved"; if these bits are redefined in the future, software may get back something other than 0). |
| 16–23 | Interrupt Server Number: This determines where the interrupt is to be directed by the interrupt routing hardware. If the value represents a processor in the system, then the interrupt will be directed to that processor. If it does not correspond to a particular processor, then the interrupt routing layer can route based on its presentation algorithm. |
| 24–31 | Interrupt Priority: This field specifies what priority should be assigned to the incoming interrupt. |

These registers reside in the IOC address space, and the addresses of these registers are defined by the particular design of the IOC.

External Interrupt Request Register (XIRR)

The XIRR is a 4-byte register at addresses BA+0 and BA+4. Issuing a Load instruction to the XIRR at address BA+0 causes the content of the CPPR and XISR to be sent to the processor with no side effects. This is designed for software polling of external interrupts. Issuing a Load instruction to the XIRR at address BA+4 has the following atomic side effects:

Prior to returning the content of the XIRR:

The interrupt signal 72 to the processor, whose BA is being accessed, is deactivated by the interrupt routing layer at 86 of FIG. 6. The content of the XIRR is returned to the requesting processor only after enough time has elapsed to assure that the deactivated interrupt signal has propagated through the processor's internal interrupt logic.

After the data from the XIRR is sent to the processor:

The contents of the CPPR are set to the priority of the interrupt signalled in the XISR (if XISR was zero, the CPPR field is unmodified)

The XISR is reset to 0x000000. Subsequent interrupt requests of more favored priority will now cause an interrupt to be signaled and presented in the XIRR.

When the system software begins to process an interrupt, the processor disables the interrupts—masking off any subsequent external interrupts. During the interrupt processing sequence, the software must enable the interrupts to allow subsequent interrupts to be presented. Care must be taken to insure that the contents of the XIRR at BA+4 have been returned to the processor prior to enabling interrupts, in order to avoid a race with interrupt routing layer's interrupt signalling termination. Such a race can produce undefined results. One way to insure the data has returned, in the face of potential processor speculative instruction execution, is to place an XIRR value data dependency in the code prior to the code which enables the interrupts. The processor register which is receiving the XIRR value is compared with itself, and a branch-if-equal instruction is executed using the results of this comparison, with the branch target address being the next instruction location.

This setting of the CPPR on the Load of the XIRR has the effect of rejecting all less favored or equal priority external interrupts from the time that the software issues a Load instruction to the XIRR until it issues a Store instruction to the CPPR with a new value.

Issuing a Store instruction to the XIRR facility at BA+0 is undefined (data is ignored). Storing to the XIRR at address BA+4 has atomic side effects and the effects are different for a 1-byte versus a 4-byte Store. When the Store instruction is a 1-byte Store, then this is a Store to the CPPR (see CPPR Register description). When the Store instruction is issued to the XIRR with a length of 4 bytes, an interrupt reset is sent to the source as indicated in the data that accompanies the Store to the XISR (not to the source indicated in the XISR at the time of the Store). The data that accompanies the Store to the XISR is not written into the XISR (and will not be obtained if subsequently read with a Load instruction). Rather, it is used to indicate the source to be reset to the interrupt routing layer (and to the IOC for interrupts other than inter-processor and global queue interrupts). Issuing a Store to the XISR at this address allows the source to present subsequent interrupts at the level indicated in the data accompanying the Store instruction. For a 4-byte Store, byte 0 is stored in the CPPR, but the system software ensures that this store of the CPPR is of a less favored or equal priority than the previous CPPR value, because hardware is not required to handle dual resets for this case (one for the change in CPPR value to a more favored or equal priority, and one for a write to the XISR).

If the interrupt routing layer hardware elects to reject interrupts on a CPPR change from a more favored to a less favored level, then on a 4-byte Store to the XIRR, the interrupt routing layer hardware can do one of two things:

1. Send two rejections back to the sources (one for the CPPR change and one for the XISR write)
2. Send the rejection for the XISR write (using the fact that the write of the CPPR must be of a less favored priority than the previous CPPR value; a requirement placed on the software).

In order for the herein described interrupt mechanism to be used across differing systems potentially having different processors, the interrupt routing layer must insure that all interrupt signal constraints of a particular processor are met. If, for example, the processor does not internally latch the interrupt signal, and is not able to guarantee proper operation if the interrupt signal was deactivated during the processor's interrupt presentation cycle, then the interrupt routing layer should externally latch the interrupt signal resetting the latch with the read of the XISR rather than as the result of an interrupt rejection.

At the end of the interrupt handler, writing the XIRR at BA+4 with the value read at the start of the interrupt handler has the combined effects of issuing an explicit end of interrupt to the IOC and returning the processor's operating priority to its pre-interrupt value.

When software is polling interrupts, after the software decides to take an interrupt, the software must signal the hardware that the interrupt is being taken by issuing a Load to XIRR at BA+4. Software must then compare the XISR with the value it read at BA+0 to make sure that the hardware did not change the XISR between the Loads.

Current Processor Priority Register (CPPR)

This register is a 1-byte register and is used to contain the current priority of the processor to which it is associated. This register is at addresses BA+0 and BA+4. Issuing a 1-byte Load to the CPPR (at either BA+0 or BA+4) has no side effects. The CPPR is a field in the XIRR register. Each processor has its own CPPR. When the processor changes state, software may store the process priority of the processor into the CPPR. The interrupt routing layer rejects all interrupts for a processor that are at a priority less favored to the CPPR priority. Thus, keeping the CPPR current will prevent an external interrupt from interrupting a process of more favored or equal priority.

The CPPR is a field in the XIRR and can be read or written as part of the XIRR. When the contents of the CPPR are changed, the interrupt routing layer insures that only interrupts of more favored level are signaled to the processor and are presented in the XIRR. This is accomplished using a hardware comparator. If the incoming interrupt priority is less than or equal to the current CPPR, then the interrupt is rejected back to the source. It is acceptable for the hardware to recompute (possibly by interrupt rejection) the most favored interrupt to present after any Store to the CPPR if the direction of change of priority is to a less favored priority, and it is mandatory if the Store to the CPPR is a more favored or equal priority to any queued interrupt. When an interrupt is removed from the XIRR because of a store to the CPPR, if there is no interrupt of higher priority (higher than the new CPPR value) waiting to replace it in the XISR, then the interrupt presentation hardware sets the XISR to a value of 0 (atomically, with the CPPR store), indicating that no interrupt is pending, and lowers the interrupt request line to the processor.

External Interrupt Source Register (XISR)

This register is a 3-byte register and contains the address of the source of the interrupt. Each processor has its own XISR. This register is at address BA+1 and BA+5. However, this register must be accessed as part of the XIRR for purposes of atomicity. Issuing a Load instruction to the XIRR at address BA+0 causes the content of the XISR to be returned to the processor with no side effects. This is designed for software polling of external interrupts. Issuing a Load instruction to the XIRR at address BA+4 has the side effects of resetting the XISR to 0x000000 atomically after the contents of the XIRR have been returned to the processor. Subsequent interrupt requests of more favored priority will then cause an interrupt to be signaled and presented in the XIRR.

Several values have special meanings in the XISR register, as described and shown below in Table 3.

TABLE 3

XISR Special Values

| Value | Meaning |
|---|---|
| 0x000000 | Reset: This value indicates that there are no current external interrupts pending. The XISR takes on this value as a side effect of a load from the XIRR at location BA + 4. |
| 0x000001 | Early Power Off Warning (EPOW): This value indicates that an EPOW interrupt is pending. |
| 0x000002 up to but not including the first IOID value | Inter-Processor Interrupt (IP): These values indicate that an Inter-Processor Interrupt is pending (see the definition of the MFRR, below). There is one value allocated per MFRR. In an MP System, each processor has an MFRR with its XISR value of 0x000002. The system configuration software will have to setup the first IOID in the system such that the value loaded into the XISR for the lowest IOID will be greater than the largest previously defined IOID values. |

Queued Interrupt Request Register (QIRR)

The Queued Interrupt Request Register is a 4 byte register with the first byte being the Most Favored Request Register (MFRR) and the remaining low order 3 bytes as being the ISSR, if implemented. Software may write either a single byte, the MFRR, or a full four bytes.

Most Favored Request Register (MFRR)

This is a 1-byte register. The content of this register is controlled by system software and indicates the most favored interprocessor (IP) interrupt priority on an IP interrupt queue 42, 43 for the processor or server to which the particular MFRR is associated. If an MFRR for a processor is set to a value of 0xff, then there are no items in that IP interrupt queue 42, 43 for that processor, and the hardware is not to signal an IP interrupt to that processor. When the system software puts something on an IP queue 42, 43 for a processor, it will also set this register to the priority of the most favored item on the IP queue. When this register is a value other than 0xff, it is treated by the interrupt routing layer as another interrupt request competing for presentation to the processor via the XIRR. When the value in an MFRR is the most favored of all interrupt requests directed to the processor, an appropriate value is placed into the XISR (see XISR description) and an interrupt is signaled to the processor. As with all other interrupt sources, an MFRR interrupt shall be resubmitted if and only if the interrupt condition has not been reset when either the interrupt is rejected by the routing layer or software issues the end of interrupt. The interrupt condition is taken to be an MFRR value other than 0xff. Therefore, once the MFRR has a non-0xff value, and the interrupt routing layer has started to route the interrupt, the interrupt routing layer will not reroute the interrupt request to the interrupt presentation layer because of a subsequent change of value in the MFRR. The only way that the interrupt routing layer will reroute the MFRR interrupt request is due to an interrupt rejection or an interrupt reset (given that the MFRR does not have the value 0xff). The MFRR's value is only changed by a software store operation. Each processor has at least one MFRR. There is also one or more global MFRR's in an MP system. The MFRR's associated with a specific processor's IP interrupt mechanism is located at an address of BA+12, BA+16, and so on.

Global Queued Interrupt Request Register (G_QIRR)

The Queued Interrupt Request Register 73 is a 4 byte register with the first byte being the Global Most Favored Request Register (Q_MFRR), which is an MFRR, and the remaining low order 3 bytes as being the ISSR. Software may write either a single byte, the G_MFRR, or a full four bytes. The starting address for the global server's interrupt management area is referred to as its base address (BA). The BA for each global server is different, and is established at setup time. The layout of the global server interrupt management area is as follows:

TABLE 4

| Address | Byte 0 | Byte 1 | Byte 2 | Byte 3 | Comments |
|---|---|---|---|---|---|
| BA+12 | G_MFRR | | ISSR | | Required QIRR for MP Systems |
| BA+16 | G_MFRR | | ISSR | | Optional 2nd QIRR |
| BA+20 | G_MFRR | | ISSR | | Optional 3rd QIRR |
| ••• | G_MFRR | | ISSR | | Optional nth QIRR |

Interrupt Management Area: Interrupt Presentation Layer Registers

The ISSR (Interrupt Source Specification Register) contains the value to be loaded into the XISR when the interrupt associated with the corresponding MFRR is signalled to a processor.

Interrupt Signalling Between Device and Controller

Table 5 details the interrupt packet format designed for the IBM PowerPC 601 system bus. This system bus is further described in the "PowerPC 601 RISC Microprocessor User's Manual", 1992, and hereby incorporated by reference as background material. The same address bit definitions could similarly be used for other data processing machines using other processors. The Transfer Type bits are specific for the 601 bus and may change in other bus architectures.

whether this interrupt was previously rejected and is being re-submitted. For an interrupt reset operation, address bits 0-2 indicate the cause of the interrupt reset. Address bits 3-11 specify the system address or route of the requesting IOC. Address bits 12-15 identify which one of up to 16 sources within the IOC made the request. Address bits 16-23, the server number, are taken directly from the XIVR register of the interrupt source. The server bits are compared, by each server, to the server number written to a configuration register at set-up time for that particular server. Address bits 24-31 in the request packet contain the interrupt's priority and also come from the XIVR of the interrupt source. These priority bits are compared against the current value if the CPPR to determine if an interrupt request will be accepted. Address bits 24-31 in the reset packet are reserved, and contain X'00'.

FIGS. 7 and 8 depict the bus signalling of the data processing interrupt subsystem. Referring first to FIG. 7, when an IOC has an interrupt request, the IOC requests the address bus from the central bus arbitrator by activating its bus request signal, BR 100. The arbitrator grants the bus by activating the corresponding bus grant (BG) signal 102 to the IOC. The IOC then sends an interrupt request packet over the address bus. This is done by driving the transfer start (TS) 104, bus address 110 and transfer-type (TT) 108 lines to certain values (as defined in Table 5) to tell the interrupt controller there is an interrupt of a certain source and priority. In addition, signal address bus busy (ABB) 106 is driven low by the IOC to indicate that the address bus is in use. The interrupt controller processes the information and signals an interrupt to the processor. In a multiprocess-

TABLE 5

| OPERATION | Transfer Type | GLB | ADDRESS BITS 0-2 | ADDRESS BITS 3-11 | ADDRESS BITS 12-15 | ADDRESS BITS 16-12 | ADDRESS BITS 24-31 |
|---|---|---|---|---|---|---|---|
| Interrupt Request | 10110 | 1 | RESERVED Default value B'000' Optional values below B'001' — First Presentation of interrupt B'010' — Representation of a rejected interrupt | IOID | Interrupt Source | Server Number | Interrupt Priority |
| Interrupt Reset | 10111 | 1 | RESERVED Default value B'000' Optional values below B'100' — Interrupt Reset caused by store to XIRR B'101' — Interrupt Reject due to store to CPPR B'110' — Interrupt Reject due to XISR being full B'111' — Interrupt Reject due to priority of request vs. CPPR | IOID | Interrupt Source | Server Number | RESERVED Set to X'00' |

The transfer type field is used to identify the type of transfer occurring on the address bus, e.g. an interrupt request or an interrupt reset. The global (GBL) bit is used to indicate that ever device on the bus should monitor the transaction, and is always enabled for interrupt packet transfer. The address bit lines are grouped into 4 subsets. Address bits 0-2 are used to provide further information for the particular type of transfer which is occurring. For an interrupt request operation, address bits 0-2 indicate whether this a first or subsequent presentation of an interrupt, and thus indicates ing system, the interrupt controller may route the interrupt information to an appropriate processor, as previously described. The address acknowledgment signal (AACK) is driven low by the bus arbitrator to indicate that the address portion of the transaction has been completed.

Referring now to FIG. 8, when the processor is done processing the interrupt, it will alert the interrupt controller to send a reset packet to the IOC (storing to XIRR register, as previously discussed). The interrupt controller then requests the address bus from the central bus arbitrator by activating its bus request signal, BR 100. The arbitrator grants the bus by activating the corresponding bus grant (BG) signal 102 to the IOC. The IOC sends an interrupt reset packet over the address bus. It does this by driving the TS 104, bus address 110 and TT 108 lines to certain values (as defined in Table 5) to tell the IOC that the interrupt has been serviced. In addition, signal address bus busy (ABB) 106 is driven low by the IOC to indicate that the address bus is in use. The address acknowledgment signal (AACK) is driven low by the bus arbitrator to indicate that the address portion of the transaction has been completed.

A tenure consists of transferring one address and between 0 and 8 cycles of data. Since there are usually 4 cycles of data transfer for each address, the data bus is more heavily used than address bus. By sending interrupt information over the address bus, it is possible to use an underutilized resource, the address bus, and not use the busier data bus. Another advantage of using the address bus is that in the preferred embodiment, all IOCs currently on the system bus use the entire address bus. However, the IOCs do not all use the entire data bus. The interrupt packets going over the address bus use the address lines already in the system at a cost of zero pins and zero wires. This is in contrast to prior methods, which used several distinct interrupt lines. Since memory mapped I/O is the most widely used method of I/O, it is used as the method for sending interrupt packets. Being the most common method of I/O, and using traditional techniques known in the art, all the chips on the system bus already have logic to do memory-mapped I/O.

In the preferred embodiment, the interrupt packet definition allows for 16 interrupt sources from each of 512 IOCs. There are 256 interrupt priority levels. Each system may have 256 interrupt servers. This allows the packet definition to be used in a wide range of machines. There are reserved bits in both the Interrupt Request Packet and Interrupt Reset Packet that may be used by systems that need to transmit more information in the interrupt packets. This packet definition thus allows for providing extendability for future systems.

Older hard-wired interrupt systems provided little immediate information about an interrupt. The bus packet method provides interrupt source, IOID, priority, and server information all at the same time and in the same place. In addition to system flexibility, this makes system interrupt debug much easier. Information can be put into the reserved address bits 0–2 of the Interrupt Reset Packet to tell the IOC which kind of Interrupt Reset is being sent.

Two hundred fifty six (256) possible interrupt servers are allowed in the interrupt packet definition. This means that up to two hundred fifty six (256) processors could be in the system receiving interrupts. This packet definition allows interrupts to be easily routed to different processors. In addition, the two hundred fifty six (256) possible interrupt servers can be defined for each system, to allow up to two hundred fifty six (256) interrupt controllers in a system. Each interrupt controller can service a single processor, or a batch of servers can service each processor, as previously described.

Since interrupts are transferred over the address bus, they are sequenced with other interrupts and with other system operations. This is helpful during debug because it makes interrupts more observable at a system level and less asynchronous to the system. For example, the system bus can be monitored to detect interrupts being presented on the address bus. Since the address packets are sequenced (i.e. not overlapped or concurrently presented), it is easier to determine what actions invoked or otherwise caused subsequent actions.

Since interrupt information is defined in various fields in the interrupt packet instead of being hardwired on the planar, this interrupt system is very programmable. Interrupt priority, server number, interrupt source and I/O controller ID are all programmable by using this packet structure. Thus, the interrupt structure is more flexible than those of hardwired systems.

While the invention has been shown and described with reference to particular embodiments thereof, it will be understood by those skilled in the art that the foregoing and other changes in form and detail may be made therein without departing from the spirit and scope of the invention.

What is claimed is:

1. A system for processing interrupt requests within a data processing system having a plurality of processors and a plurality of interrupt sources, wherein each of said interrupt requests is associated with a priority and each of said plurality of processors is associated with a variable priority, said system comprising:

a software-accessible interrupt presentation layer including a plurality of queues for storing interrupt requests, wherein each of said plurality of queues is associated with a respective one of said plurality of processors, and wherein interrupt requests within each queue among said plurality of queues are only handled by a respective associated processor among said plurality of processors;

a hardware routing means for routing an interrupt request issued by a particular one of said plurality of interrupt sources to a particular queue among said plurality of queues that is associated with a particular processor among said plurality of processors; and means for preventing priority inversion, wherein said means for preventing priority inversion removes said interrupt request from said particular queue in response to said interrupt request having a lower priority than said variable priority of said particular processor when another interrupt request having a higher priority than said variable priority of said particular processor is received by said particular queue and said particular queue is full.

2. The system for processing interrupt requests of claim 1, wherein said hardware routing means routes said interrupt request to a best processor determined based upon a priority associated with said interrupt request and variable priorities associated with said plurality of processors.

3. The system for processing interrupts of claim 1, wherein said interrupt request presented to said particular processor includes a single source identifier that specifies which if said plurality of interrupt sources issued said interrupt request.

4. The system of claim 1, wherein at least two of said plurality of processors are grouped into a of logical server;

said interrupt presentation layer includes a server queue associated with said logical server; and said hardware routing means includes means for routing an interrupt request to said server queue and means for queuing said interrupt request within said server queue.

5. The system of claim 4, wherein:

said means for preventing priority inversion removes a selected interrupt request from said server queue in response to receipt of a second interrupt request at said server queue when said server queue is full, said second interrupt request having a higher priority than said selected interrupt request.

6. The system of claim 4, wherein said hardware routing means routes said interrupt request to a best processor within said logical server, said best processor determined based upon a priority associated with said interrupt request and variable priorities associated with processors within said logical server.

7. The system for processing interrupt requests of claim 1, wherein each of said plurality of interrupt sources comprises:

means for storing an interrupt request rejected by said means for routing; and means for reissuing said interrupt request rejected by said means for routing.

8. The system for processing interrupt requests of claim 1, wherein said interrupt request is transmitted from said particular one of said plurality of interrupt sources to said means for routing via an address bus of said data processing system.

9. The system for processing interrupt requests of claim 1, wherein said plurality of interrupt sources includes said plurality of processors.

10. The system for processing interrupt requests within a data processing system of claim 1, wherein said particular queue associated with said particular processor is a logical queue comprising at least one queue of hardware-generated interrupts and one queue of software-generated interrupts.

11. The system for processing interrupt requests within a data processing system of claim 10, wherein said interrupt presentation layer presents only a most favored interrupt request selected from among said at least one queue of software-generated interrupt requests and at least one queue of hardware-generated interrupt requests.

12. The system of claim 1, wherein said hardware routing means includes means for rejecting said interrupt request if said particular queue is full and a priority associated with said interrupt request is lower than a priority associated with another interrupt request within said particular queue.

13. The system of claim 1, and further comprising software interrupt servicing means for servicing said interrupt request presented to said particular processor.

14. A method for processing interrupt requests within a data processing system having a plurality of processors and a plurality of interrupt sources, wherein each of said interrupt requests is associated with a priority and each of said plurality of processors is associated with a variable priority, said data processing system including a software-accessible interrupt presentation layer, said interrupt presentation layer includinq a plurality of queues for storing interrupt requests, wherein each of said plurality of queues is associated with a single one of said plurality of processors, said method comprising:

issuing a first interrupt request from a particular one of said plurality of interrupt sources;

routing said first interrupt request to a particular queue within said interrupt presentation layer that is associated with a particular processor among said plurality of processors;

queuing said first interrupt request within said particular queue associated with said particular processor, wherein only said particular processor handles interrupt requests within said particular queue; and thereafter, removing said first interrupt request from said particular queue in response to receipt of a second interrupt request at said particular queue when said particular queue is full, said second interrupt request having a higher priority than said variable priority of said particular processor.

15. The method for processing interrupt requests of claim 14, wherein each of said plurality of processors is associated with a variable priority, and wherein said step of queuing said first interrupt request comprises queuing said first interrupt request for access by a best processor determined based upon a priority associated with said interrupt request and variable priorities associated with said plurality of processors.

16. The method of claim 14 said method comprising:

grouping at least two of said plurality of processors into a logical server; and providing a server queue associated with said logical server within said interrupt presentation layer, wherein interrupt requests queued within said server queue may be accessed and serviced by any of said at least two processors within said logical server.

17. The method of claim 16, wherein said step of queuing said first interrupt request comprises queuing said first interrupt request for access by a best processor within said logical server, said best processor determined based upon a priority associated with said first interrupt request and variable priorities associated with those of said plurality of processors grouped within said logical server.

18. The method for processing interrupt requests of claim 14, and further comprising:

rejecting an interrupt request;

storing said rejected interrupt request issued by said particular interrupt source at said particular interrupt source; and reissuing said rejected interrupt request.

19. The method for processing interrupt requests of claim 14, wherein said step of issuing a first interrupt request comprises transmitting said first interrupt request from said particular one of said plurality of interrupt sources to said particular queue via an address bus of said data processing system.

20. The method for processing interrupt requests of claim 14, wherein said step of issuing a first interrupt request from a particular one of said plurality of interrupt sources comprises issuing a first interrupt request from a particular one of said plurality of processors.

21. The method for processing interrupt requests within a data processing system of claim 14, wherein said particular queue associated with said particular processor is a logical queue comprising at least one queue of hardware-generated interrupts and one queue of software-generated interrupts, said method further comprising:

presenting an interrupt request queued within said particular queue associated with said particular processor to said particular processor for servicing.

22. The method for processing interrupt requests within a data processing system of claim 21 wherein said step of presenting an interrupt request comprises presenting only a most favored interrupt request selected from among said at least one queue of software-generated interrupt requests and at least one queue of hardware-generated interrupt requests.

23. The method of claim 14, and further comprising the step of rejecting said interrupt request without queuing said interrupt request if said particular queue is full and a priority associated with said interrupt request is lower than a priority associated with another interrupt request within said particular queue.

24. The method of claim 14, said method further comprising:

accessing said interrupt request within said particular queue utilizing interrupt servicing software executed by said particular processor; and servicing said interrupt request accessed by said particular processor.

25. The method of claim 24, wherein said interrupt request accessed by said particular processor includes a single source identifier that specifies which of said plurality of interrupt sources issued said interrupt request.

* * * * *

UNITED STATES PATENT AND TRADEMARK OFFICE
CERTIFICATE OF CORRECTION

PATENT NO. : 5,701,495
DATED : Dec. 23, 1997
INVENTOR(S) : Arndt et al.

It is certified that error appears in the above-indentified patent and that said Letters Patent is hereby corrected as shown below:

In col. 3, line 57, please delete the word "shows."

In col. 5, line 5, please change "0x5500" to --0x55--.

Signed and Sealed this

Thirtieth Day of June, 1998

Attest:

BRUCE LEHMAN

Attesting Officer

Commissioner of Patents and Trademarks